United States Patent [19]
Fukuyama et al.

[11] Patent Number: 5,521,731
[45] Date of Patent: May 28, 1996

[54] REFLECTIVE TYPE LIQUID CRYSTAL DISPLAY DEVICE AND METHOD OF MAKING THE SAME WHEREBY THE SWITCHING MIM HAS ITS FIRST ELECTRODE USED FOR SIGNAL WIRING AND ITS SECOND ELECTRODE USED AS PIXEL ELECTRODES

[75] Inventors: Toshiaki Fukuyama, Nara; Yoshihisa Ishimoto, Sakai; Masahiro Kishida, Nabari; Toshiyuki Yoshimizu, Nara, all of Japan

[73] Assignee: Sharp Kabushiki Kaisha, Osaka, Japan

[21] Appl. No.: 186,459

[22] Filed: Jan. 25, 1994

[30] Foreign Application Priority Data

Feb. 8, 1993 [JP] Japan ................... 5-020366

[51] Int. Cl.$^6$ .................. G02F 1/136; G02F 1/1333; G02F 1/1343
[52] U.S. Cl. ................ 359/58; 359/51; 359/52; 359/54; 359/79
[58] Field of Search ................ 359/51, 54, 52, 359/87, 58, 79

[56] References Cited

U.S. PATENT DOCUMENTS

| | | | |
|---|---|---|---|
| 4,632,514 | 12/1986 | Ogawa et al. | 350/339 F |
| 4,671,642 | 6/1987 | Ohkubo et al. | 359/70 |
| 5,289,300 | 2/1994 | Yamazaki et al. | 359/59 |
| 5,321,536 | 6/1994 | Ishii et al. | 359/58 |

FOREIGN PATENT DOCUMENTS

| | | |
|---|---|---|
| 2-304534 | 12/1990 | Japan . |
| 3-41420 | 2/1991 | Japan . |
| 3-063623 | 3/1991 | Japan ................ 359/59 |
| 5107556 | 10/1991 | Japan ................ 359/87 |
| 5107556 | 4/1993 | Japan ................ 359/87 |

OTHER PUBLICATIONS

White et al, "New Absorptive Mode Reflective Liquid-Crystal Display Device", Journal of Applied Physics, vol. 45, No. 11, Nov. 1974, pp. 4718-4723.

Koizumi et al, "Reflective Multicolor LCD (II): Improvement in the Brightness", Proceedings of the SID, vol. 29/2, 1988, pp. 157-160.

*Primary Examiner*—Anita Pellman Gross
*Assistant Examiner*—Fetsum Abraham
*Attorney, Agent, or Firm*—Nixon & Vanderhye

[57] ABSTRACT

The invention increases the aperture ratio of a reflective type liquid crystal display device and raises the display quality. First conductor layers are formed in a band on a surface of a substrate, and insulator layers are formed on the surface thereof. Second conductor layers are formed on the insulator layers. The first conductor layers, insulator layers, and second conductor layers are so-called MIM elements and the first conductor layers are also signal wirings. The second conductor layers are also reflectors and pixel electrodes. Such substrate is disposed on substrate on which band-shaped counter electrodes are formed through a liquid crystal layer containing dichroic pigment or a high molecular resin layer dispersing liquid crystal.

18 Claims, 14 Drawing Sheets

REFLECTIVE TYPE LIQUID CRYSTAL DISPLAY DEVICE AND METHOD OF MAKING THE SAME WHEREBY THE SWITCHING MIM HAS ITS FIRST ELECTRODE USED FOR SIGNAL WIRING AND ITS SECOND ELECTRODE USED AS PIXEL ELECTRODES

BACKGROUND OF THE INVENTION

1. Field of the Invention

The present invention relates to a reflective type liquid crystal display device and method of making the same, and more particularly to a reflective type liquid crystal display device possessing MIM (metal-insulator-metal) element and method of making the same.

2. Description of the Related Art

Recently, the application of liquid crystal display device into the word processor, lap top personal computer, portable television and the like is rapidly increasing. In particular, among the liquid crystal display devices, the reflective type liquid crystal display device for displaying by reflecting the light entering from outside is highly noticed because the back light is not needed, the power consumption is low, and the structure can be made thin and lightweight.

Hitherto, in the reflective type liquid crystal display device, the TN (twisted nematic) type and STN (super twisted nematic) type have been widely employed, but in these types, since ¾ of the light intensity of the incident light is cut off by the polarizer, the display is dark.

To solve such problem, a display mode is proposed for effectively utilizing all rays of incident light without using polarizer. An example of such display mode is the phase transition type guest-host mode. A display device of such phase transition type guest-host mode is disclosed, for example, by D. L. White and G. N. Taylor: J. Appl. Phys. 45, 4718, 1974. This mode makes use of the cholesteric-nematic phase transition phenomenon by electric field. A microcolor display applying this mode has been proposed by Tohru Koizumi and Tatsuo Uchida in Proceedings of the SID, VOL. 29/2, 157, 1988.

In the TN type, when multiplex drive is effected by voltage equalizing method desired from the standpoints of larger size, higher definition, and lower production cost of the device, sufficient contrast and intermediate tone display may not be obtained. That is, as the display becomes larger in size and higher in definition, the number of pixels increases, and in order to obtain a sufficient contrast in such liquid crystal display device, a steeper property is required as the optical characteristic change of the liquid crystal to voltage changes. However, when the optical characteristic change of the liquid crystal becomes steep, it is hard to obtain the intermediate tone display. Accordingly, in order to obtain a high contrast while keeping moderate optical characteristic changes relative to voltage changes, active drive employing nonlinear elements, that is, three-terminal elements such as TFT (thin-film-transistor) elements, and two-terminal elements such as diode elements and MIM (metal insulator metal) elements is executed. In particular, in the reflective type liquid crystal display device, the two-terminal elements having a greater aperture rate as compared with the three-terminal elements, that is, a greater rate of the active moving picture area to the display picture area is preferably used.

FIG. 16 is a plan view showing a region 7 of an insulating substrate 1 corresponding to one pixel in a conventional reflective type liquid crystal display device. Incidentally, in FIG. 16 which is a plan view, an MIM element 4 is indicated by hatching. The region 7 corresponding to one pixel is constituted by comprising a pixel electrode 2 responsible for display being formed on the insulating substrate 1, and a signal wiring 3 and MIM element 4 not responsible for display. The MIM element 4 shown in hatched area is a nonlinear switching element of two-terminal element for connecting the pixel electrode 2 and signal wiring 3.

FIG. 17 is a sectional view of cutting off the MIM element 4 shown in FIG. 16 on a cut-off line A—A. The MIM element 4 is composed of a lower electrode 3a which is a part of the signal wiring 3 formed on the insulating substrate 1, an insulator 5, and an upper electrode 6. On the lower electrode 3a, the insulator 5 is formed, and the upper electrode 6 is formed on the insulator 5. On the insulating substrate 1 including a part of the upper electrode 6, the pixel electrode 2 is formed. The insulating substrate 1 having such MIM elements 4 disposed corresponding to plural pixels is glued with a counter substrate forming a counter electrode through a liquid crystal layer.

Generally is known the MIM element using tantalum (Ta) as the lower electrode 3a, using tantalum oxides ($TaO_x$) as the insulator 5, and using chromium (Cr), titanium (Ti) or aluminum (A1) as the upper electrode 6. The display device using such MIM element is disclosed, for example, in the Japanese Unexamined Patent Publication (KOKAI) No. JP-A 3-35223, 3-41420, 2-308138, 2-304534, 3-149526, 2-83538, 3-296024, and 4-114132.

FIG. 18 is an equivalent circuit diagram of a reflective type liquid crystal display device using the MIM elements 4. The signal electrode wirings (data wirings) are indicated as D1, D2, D3, — (or D collectively), and scanning electrode wirings (address wirings) as S1, S2, —(or S collectively), and the individual wirings are arranged so as to intersect alternately by a plurality each. At the intersections of these wirings, the liquid crystal cell LC and MIM element 4 are connected in series. The current flowing in the MIM element 4 depends on the interface characteristic of the lower and upper electrodes 3a, 6 and the insulator 5, and approximately, $I=aV^n$ is given. Therefore, the nonlinearity of the MIM element 4 can be evaluated by the value of n. Herein, I denotes the current, v is the voltage, and a and n are constants.

FIG. 19 is an equivalent circuit diagram of one pixel of the reflective type liquid crystal display device using the MIM elements 4. The resistance of the MIM element 4 is expressed as $R_{NL}$, and the capacity is $C_{NL}$. The resistance of the liquid crystal cell LC is expressed as $R_{LC}$, and the capacity is $C_{LC}$. The MIM element 4 is expressed by a parallel circuit of resistance $R_{NL}$ and capacity $C_{NL}$, and the liquid crystal cell LC is expressed by a parallel circuit of resistance $R_{LC}$ and capacity $C_{LC}$. The MIM element 4 comprises a nonlinear voltage-current characteristic, and the resistance $R_{NL}$ changes suddenly by the voltage at both ends.

A selection pulse of amplitude V1 is applied in every period T to the scanning electrode wiring S, and data signals for determining the orientation state of liquid crystal and determining the display state are applied to the signal electrode wiring D in an amplitude ±V2. When the selection pulse is applied to the scanning electrode wiring S, the voltage (V1±V2) applied to the selected pixel is divided in capacity, and the voltage applied to the MIM element 4 is expressed as $V_{NL}=C_{LC}/(C_{LC}+C_{NL})\cdot(V1\pm V2)$. Herein, when the capacity $C_{NL}$ of the MIM element 4 is set sufficiently small as compared with the capacity $C_{LC}$ of the liquid crystal cell LC, almost all voltage is applied to the MIM element 4, and the MIM element 4 is set in ON state having a low resistance, and the electric charge corresponding to the display data is written into the capacity $C_{LC}$ of the liquid crystal cell LC. The written data is held by the capacity $C_{LC}$ of the liquid crystal cell LC for the duration until selected again and new data is written.

In the region 7 of the insulating substrate 1 corresponding to one pixel of a reflective type liquid crystal display device using the MIM elements 4, the active region functioning for screen display is a forming region of the pixel electrode 2 except for the overlapping portion with the upper electrode 6. The nonactive region not functioning for screen display is a region other than the active region, and includes the signal wiring 3, gap of pixel electrode 2 and signal wiring 3, and gap of adjacent pixel electrodes 2. In this case, the aperture rate is 70 to 50%.

Recently, along with the trend of higher definition of the liquid crystal display device, a higher density is required for the number of pixels. As a result, the aperture rate is lowered, the display becomes darker, and the display quality is lowered, so that various problems may be caused. This is because the rate of the active region is lowered as the minimum required area as the MIM element 4 and signal wiring 3 is limited if the number of pixels is heightened in density.

SUMMARY OF THE INVENTION

It is hence a primary object of the invention to present a reflective type liquid crystal display device enhanced in the aperture rate and improved in the display quality and method of making the same.

The invention presents a reflective type liquid crystal display device comprising:

a nematic liquid crystal layer or a cholesteric liquid crystal layer containing dichroic pigment, or a high molecular resin layer dispersing liquid crystal, interposed between a pair of insulating substrates at least one of which possessing light permeability, plural common electrodes formed in a band form across a gap on the side of one substrate possessing light permeability of the pair of insulating substrates confronting the other substrate side, plural first conductors formed in a band form across a gap in a direction orthogonal to the common electrodes on one side of the other substrate of the pair of insulating substrates, band-shaped insulators formed on the plural first conductors individually, and second conductors possessing reflectivity, formed in a region overlapping with the common electrodes on the insulators.

The invention also comprises organic insulators formed on the surface of the other substrate on which the first conductors and band-shaped insulators are formed, and possessing penetration holes at predetermined positions on the band-shaped insulators, wherein the second conductors are formed on the penetration holes and organic insulators.

In the invention, convex portions are formed on the surface of the organic insulators.

In the invention, a color filter is formed between one substrate and common electrodes.

In the invention, protective films are formed on the surface of one substrate on which the common electrodes are formed, and on the surface of the other surface on which the first conductors, band-shaped insulators and second conductor are formed.

In the invention, a ultraviolet polymerized resin realized by a polymethyl methacrylate or polyacrylate monomer, a polymethyl methacrylate or polyacrylate oligomer, a mixture of them, or polyvinylalcohol is selected as a high molecular resin of the high molecular resin layer dispersing the liquid crystal.

A manufacturing method of reflective type liquid crystal display device comprising the steps of:

preparing a pair of insulating substrates either one of which possessing light permeability, forming plural band-shaped common electrodes on one side of one substrate possessing light permeability, forming plural band-shaped first conductors on one side of the other substrate, forming band-shaped insulators on the plural first conductors, and forming plural second conductors possessing reflectivity on the insulators at same line width and interval as the first conductors, adhering the pair of insulating substrates across a specific gap so that the surfaces of the substrates may confront each other, and that the common electrodes and first conductors intersect orthogonally, and moreover that the common electrodes and second conductors may overlap, and injecting a nematic liquid crystal layer or a cholesteric liquid crystal layer containing dichroic pigment, or a high molecular resin layer dispersing liquid crystal, between the pair of insulating substrates.

In the invention, a conductor film and an insulator film are laminated in this order on one side of the other substrate, and the conductor film and insulator film are patterned simultaneously in plural bands to form the first conductors and band-shaped insulators.

In the invention, the surface of the conductor film is oxidized to form the insulator film.

In the invention, a conductor film is formed on one side of the other substrate, and the conductor film is patterned into plural bands to form the fist conductors, and the band-shaped insulators are formed on the first conductors.

In the invention, a conductor film is formed on one side of the other substrate, the conductor film is patterned into plural bands, and the surface of the patterned conductor film is oxidized to form the first conductors and band-shaped insulators.

In the invention, an organic insulator is formed on one side of the other substrate on which the first conductors and band-shaped insulators are formed, and penetration holes are formed at predetermined positions on the band-shaped insulators of the organic insulators, and the second conductors are formed on the penetration holes and organic insulator.

In the invention, plural convex portions are formed on the surface of the organic insulator.

In the invention, a photosensitive resin is applied on the organic insulator, the photosensitive resin is exposed through light shielding means consisting of plural circular light shielding regions, developed, and heated, and the organic insulator is etched to form the convex portions.

In the invention, the plural circular light shielding regions possess one or two or more different diameters, and the light shielding regions are arranged irregularly.

According to the invention, plural common electrodes are formed in a band form across a gap on one substrate having light permeability of the pair of insulating substrates. On the other substrate of the pair of insulating substrates, plural first conductors and insulators are formed in this order in a band form across a gap in a direction orthogonal to the common electrodes. In the region on the insulators overlapping with the common electrodes, reflective second conductors are formed. The substrate mounting the common electrodes and the substrate mounting the first conductors, insulators and second conductors are disposed through a nematic liquid crystal layer or a cholesteric liquid crystal layer containing dichroic pigment, or a high molecular resin layer dispersing liquid crystal.

The first conductors, insulators and second conductors compose a nonlinear element called MIM element. The first conductor functions also as a signal wiring, and the second conductor functions also as a pixel electrode and a reflector.

For example, when a nematic liquid crystal layer or a cholesteric liquid crystal layer containing dichroic pigment is interposed between one substrate possessing light permeability and the other substrate, the orientation state of the liquid crystal molecules of the liquid crystal layer is controlled by applying or not applying a voltage between the common electrode and the second conductor which is the pixel electrode. The orientation state of the dichroic pigment is controlled similarly because the pigment molecules of the dichroic pigment is inclined to be oriented along the liquid crystal molecules. Therefore, the light entering from the side of one substrate passes through the liquid crystal layer when a voltage is applied, and is reflected by the reflective second conductor, and passes through the liquid crystal layer again to be emitted. This is because the liquid crystal molecules and dichroic pigment are arranged nearly in the vertical direction to the substrate surface, so that the incident light is not absorbed.

When no voltage is applied, the light entering from the side of one substrate is cut off. This is because the liquid crystal molecules and dichroic pigment are arrange irregularly, and the incident light is absorbed by the dichroic pigment.

In this manner, bright display (white display) is realized by transmission and reflection of incident light, and dark display (black display) by shielding of incident light. Or, instead of the liquid crystal layer, when the high molecular resin layer is used, by applying and not applying voltage, the orientation state of the dispersed liquid crystal layer can be controlled, so that the display may be made.

The first conductor of the so-called MIM element composed of first conductor, insulator and second conductor is used as the signal wiring, and the second conductor is used as the pixel electrode and reflector, thereby forming the insulator and second conductor on the first insulator, which does not require any particular place only for the signal wiring which is the nonactive portion not functioning in the screen display in the prior art. The place only for the MIM element is not needed, either. Accordingly, the pixel interval may be narrow and the pixel area may be wide, so that the aperture rate may be raised. Therefore, even in the reflective type liquid crystal display device utilizing the surrounding light, bright display is realized, and the display quality is enhanced. Moreover, because of the display mode not requiring the polarizer, there is no absorption of incident light by the polarizer, so that the display may be bright.

According to the invention, furthermore, the reflective type liquid crystal display device forms plural band-shaped common electrodes on one side of one substrate possessing light permeability, forms plural band-shaped first conductors on one side of the other substrate, forms band-shaped insulators on the plural first conductors, and forms plural second conductors possessing reflectivity on the insulators in the same line width and interval as the first conductors, being characterized by adhering the pair of insulating substrates across a specific gap so that the surfaces of the substrates may confront each other, and that the common electrodes and first conductors intersect orthogonally, and moreover that the common electrodes and second conductors may overlap, and injecting a nematic liquid crystal layer or a cholesteric liquid crystal layer containing dichroic pigment, or a high molecular resin layer dispersing liquid crystal, between the pair of insulating substrates.

In the invention, a conductor film and an insulator film are laminated in this order on one side of the other substrate, and the conductor film and insulator film are patterned simultaneously in plural bands to form the first conductors and band-shaped insulators.

In the invention, the surface of the conductor film is oxidized to form the insulator film.

In the invention, a conductor film is formed on one side of the other substrate, and the conductor film is patterned into plural bands to form the fist conductors, and the band-shaped insulators are formed on the first conductors.

In the invention, a conductor film is formed on one side of the other substrate, the conductor film is patterned into plural bands, and the surface of the patterned conductor film is oxidized to form the first conductors and band-shaped insulators.

In the invention, an organic insulator is formed on one side of the other substrate on which the first conductors and band-shaped insulators are formed, and penetration holes are formed at predetermined positions on the band-shaped insulators of the organic insulators, and the second conductors are formed on the penetration holes and organic insulator.

Since the penetration holes are formed, the first conductor, insulator and second conductor function as MIM element. By forming the organic insulator, it is possible to prevent short circuit of the first conductor and second conductor. For example, after patterning the first conductors and insulators, a conductive film is formed on the surface of the other substrate mounting the first conductors and insulators, and when forming the second conductors by etching the conductive film in a specified shape, if the conductive film is left over in etching process, a short circuit may be formed between the first conductor and second conductor. Such short circuit is not desired because the function as MIM element is sacrificed. However, by forming the organic insulator, such short circuit does not occur. Therefore, the reliability may be enhanced.

Besides, according to the invention, convex portions are formed on the surface of the organic insulator. Hence, undulations are formed on the surface of the second conductor which is the reflector formed on the organic insulator. By the undulations, the incident light scatters, and the intensity of the light scattering in the direction vertical to the display screen is intensified, so that the brightness and contrast are enhanced.

In the invention, a photosensitive resin is applied on the organic insulator, the photosensitive resin is exposed through light shielding means consisting of plural circular light shielding regions, developed, and heated, and the organic insulator is etched to form the convex portions.

In the invention, the plural circular light shielding regions possess one or two or more different diameters, and the light shielding regions are arranged irregularly.

In the invention, a color filter is formed between one substrate and the common electrodes. Accordingly, color display according to the colors of the color filter is realized.

In the invention, a protective film is formed on the surface of one substrate mounting the common electrodes, and on the surface of the other substrate mounting the first conductors, band-shaped insulators and second conductors.

In a high molecular dispersion type liquid crystal display device or a guest-host type liquid crystal display device, diffusion of impurities, for example, ions into the liquid crystal layer may be prevented by forming the protective film, so that contamination of the liquid crystal layer may be prevented. Accordingly, fall of holding voltage factor may be prevented. This protective film, on a TN type liquid crystal display device, may be prevented a breakdown of switching element by rubbing process, and when a crosstalk is occurred by short circuit current, deterioration of display quality ma be prevent. Besides, the preventive film is used also for an orientation film.

In the invention, a ultraviolet polymerized resin realized by a polymethyl methacrylate or polyacrylate monomer, a polymethyl methacrylate or polyacrylate oligomer, a mixture of them, or polyvinylalcohol is selected as the high molecular resin of the high molecular resin layer dispersing liquid crystal.

The material selected as the high molecular resin is easy to control the diameters of dispersed liquid crystal molecular. Accordingly, the liquid crystal display device may be driven at lower voltage. Further, homogeneous resin layer may be formed, so that fall of holding voltage factor may be prevented. Besides, the polymerized reaction speed for forming the resin layer is comparatively faster, so that the efficiency of production may be enhanced.

BRIEF DESCRIPTION OF THE DRAWINGS

Other and further objects, features, and advantages of the invention will be more explicit from the following detailed description taken with reference to the drawings wherein:

FIG. 6 (2) is an equivalent circuit diagram of the one pixel;

DETAILED DESCRIPTION OF THE PREFERRED EMBODIMENTS

Figure 1:
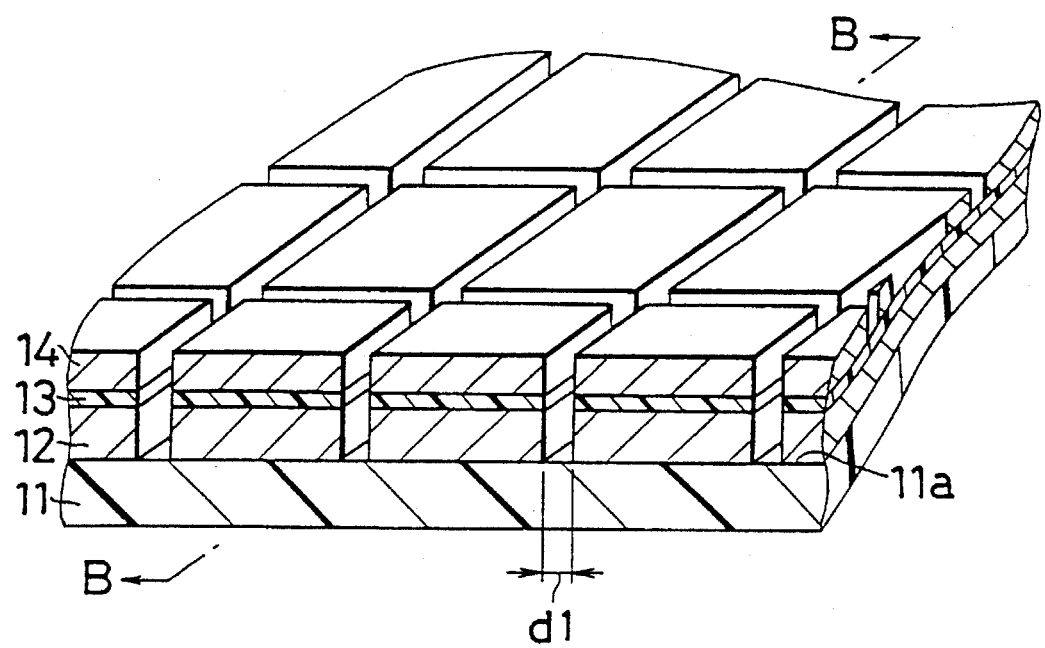
FIGS. 1 (1) and (2) are sectional perspective views showing the structure of MIM element in a reflective type liquid crystal display device 22 in a first embodiment of the invention.
Figure 1:
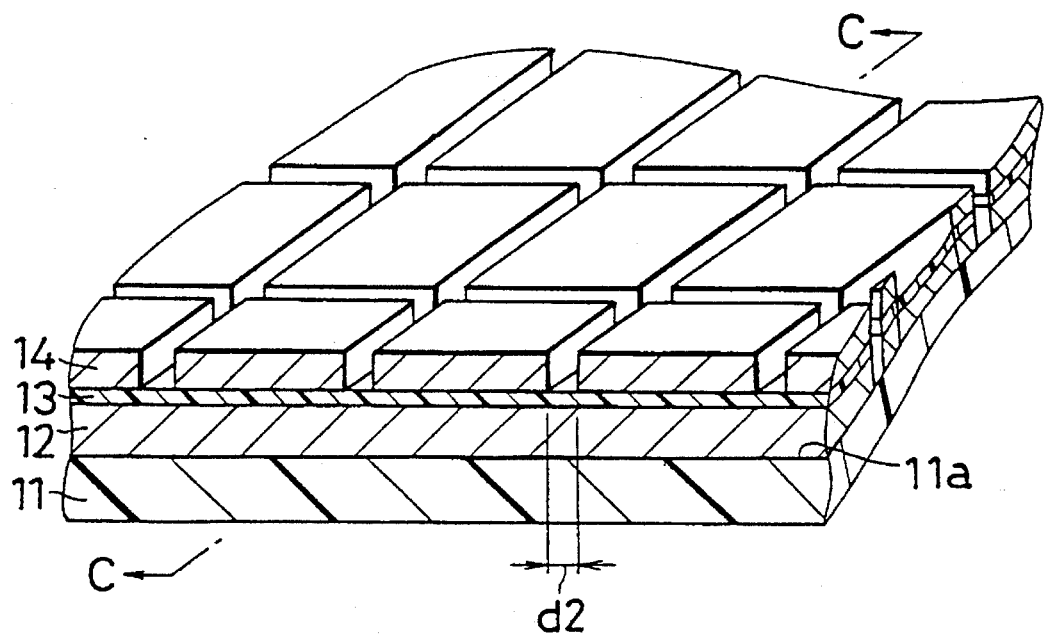

Now referring to the drawing, preferred embodiments of the invention are described below.

Figure 2:
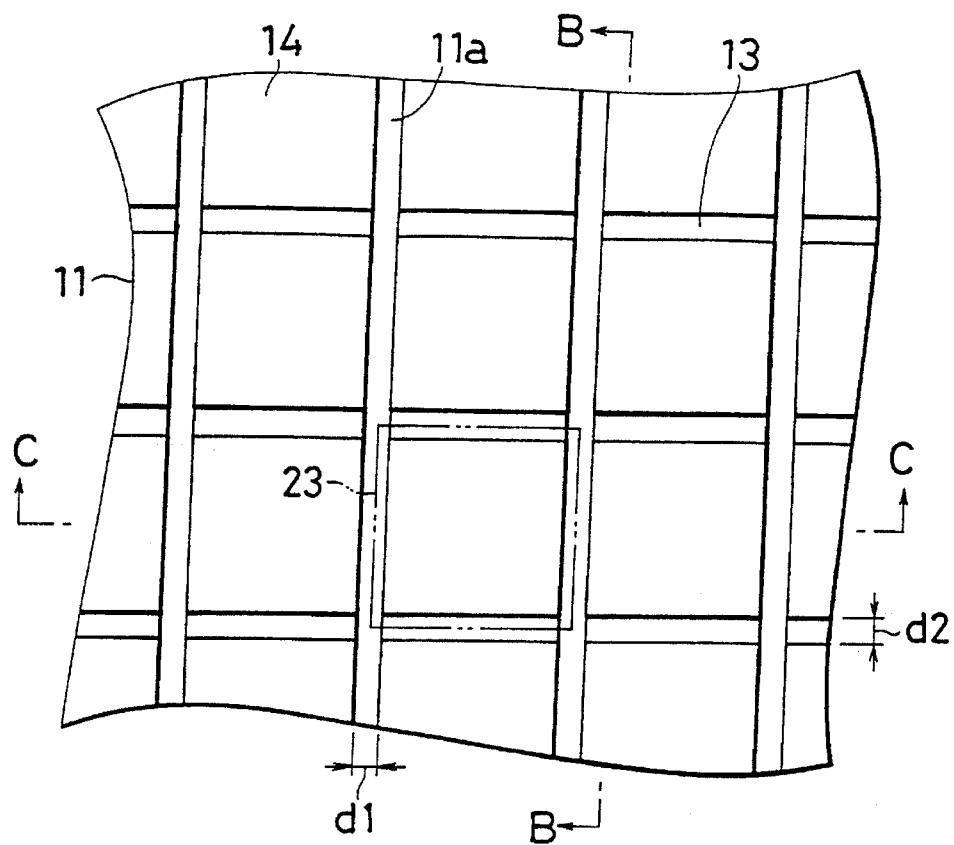
FIG. 2 is a plan view of a substrate 11 on which the MIM element is formed.

FIG. 1 is a sectional perspective view showing the structure of an MIM element in a reflective type liquid crystal display device 22 in a first embodiment of the invention, and FIG. 2 is a plan view of an insulating substrate 11 on which the MIM element is formed. Herein, FIG. 1 (1) is a sectional perspective view along cut-off line C—C, and FIG. 1 (2) is a sectional perspective view along cut-off line B—B.

The MIM element in the reflective type liquid crystal display device 22 comprises a first conductor layer 12, an insulator layer 13, and a second conductor layer 14. On the surface 11a of the insulating substrate 11, plural first conductor layers 12 are formed in a band form across a gap d1 so as to keep insulation from each other. The conductor layers 12 are realized, for example, by tantalum (Ta), of which specific resistance is 60 μΩ·cm to 100 μΩ·cm, preferably selected at 80 μΩ·cm, film thickness is 1000Å to 3000Å, preferably selected at 1500Å or less, and dielectric constant is selected at 21.5 or less. On plural band-shaped conductor layer 12, insulator layers 13 are formed. The insulator layers 13 are realized, for example, by tantalum oxides (TaO$_x$), and the film thickness is selected at 200Å to 400Å. On the insulator layers 13, second conductor layers 14 are formed in a region overlapping with transparent electrodes 18 formed on a substrate 16 mentioned later. The conductor layers 14 possess reflectivity, and are realized, for example, by aluminum (Al), and the film thickness is 500Å to 3000Å, or preferably selected at 2000Å. The conductor layers 14 are formed across a gap so that the conductor layers 14 may insulate from each other, being formed at the same gap as the gap d2 of the transparent electrodes 18 mentioned below.

Numeral 23 in FIG. 2 denotes the region of the substrate 11 corresponding to one pixel of the reflective type liquid crystal display device 22. The first conductor layers 12 serve both as the lower electrodes of the MIM element and as signal wirings, and the second conductor layers 14 serve both as the upper electrodes of the MIM element and as pixel electrode and reflector. Thus, in the reflective type liquid crystal display device 22 of the embodiment the pixel electrode is formed through the insulator layers 13 on the signal wiring, and the signal wiring, insulator layer 13 and pixel electrode are also MIM elements. Accordingly, the place only for signal wirings required conventionally is not necessary, and the place only for the MIM elements is not needed, either, so that the pixel interval may be narrowed, while the pixel area as the active region functioning in screen display can be made wide, thereby enhancing the aperture rate. In the reflective type liquid crystal display device 22 of the embodiment, the aperture rate is improved to about 97%.

Figure 3:
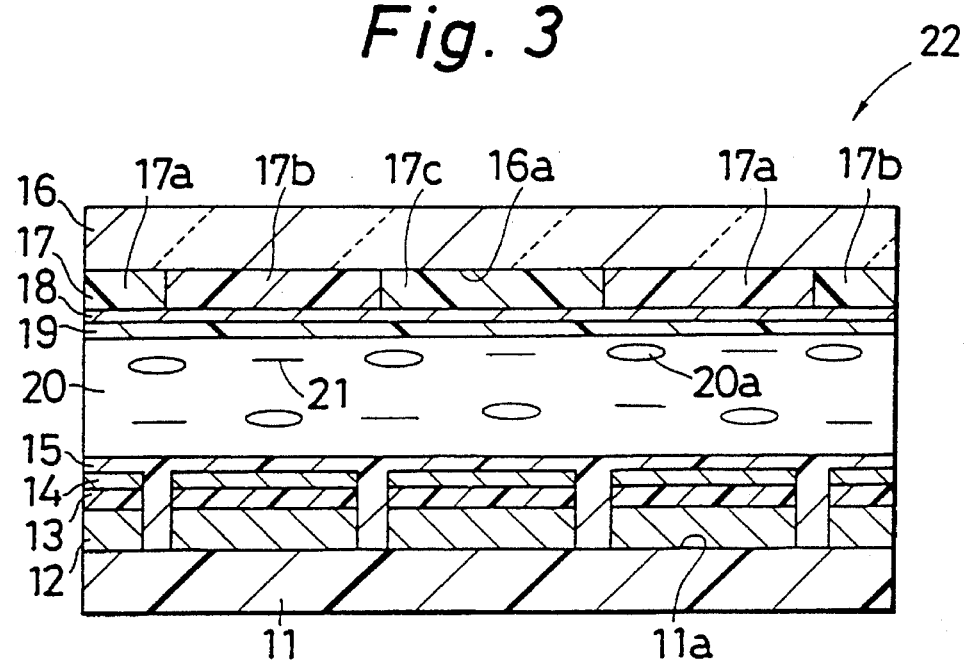
FIG. 3 is a sectional view showing the constitution of the reflective type liquid crystal display device 22.

FIG. 3 is a sectional view showing the constitution of the reflective type liquid crystal display device 22 in the first embodiment of the invention. The reflection type liquid crystal display device 22 comprises insulating substrates 11, 16, first conductor layers 12, insulator layers 13, second conductor layers 14, protective films 15, 19, a color filter 17, transparent electrodes 18, and a liquid crystal layer 20. The reflective type liquid crystal display device 22 of the embodiment is a display device of so-called White-Taylor type display mode not using polarizer.

On the surface 11a of the insulating substrate 11, the first conductor layers 12, insulator layers 13, and second conductor layers 14 are formed, and further on the surface thereof, the protective film 15 is formed for improving the smoothness. This protective film 15 is formed by baking after applying polyimide or the like.

Figure 4:
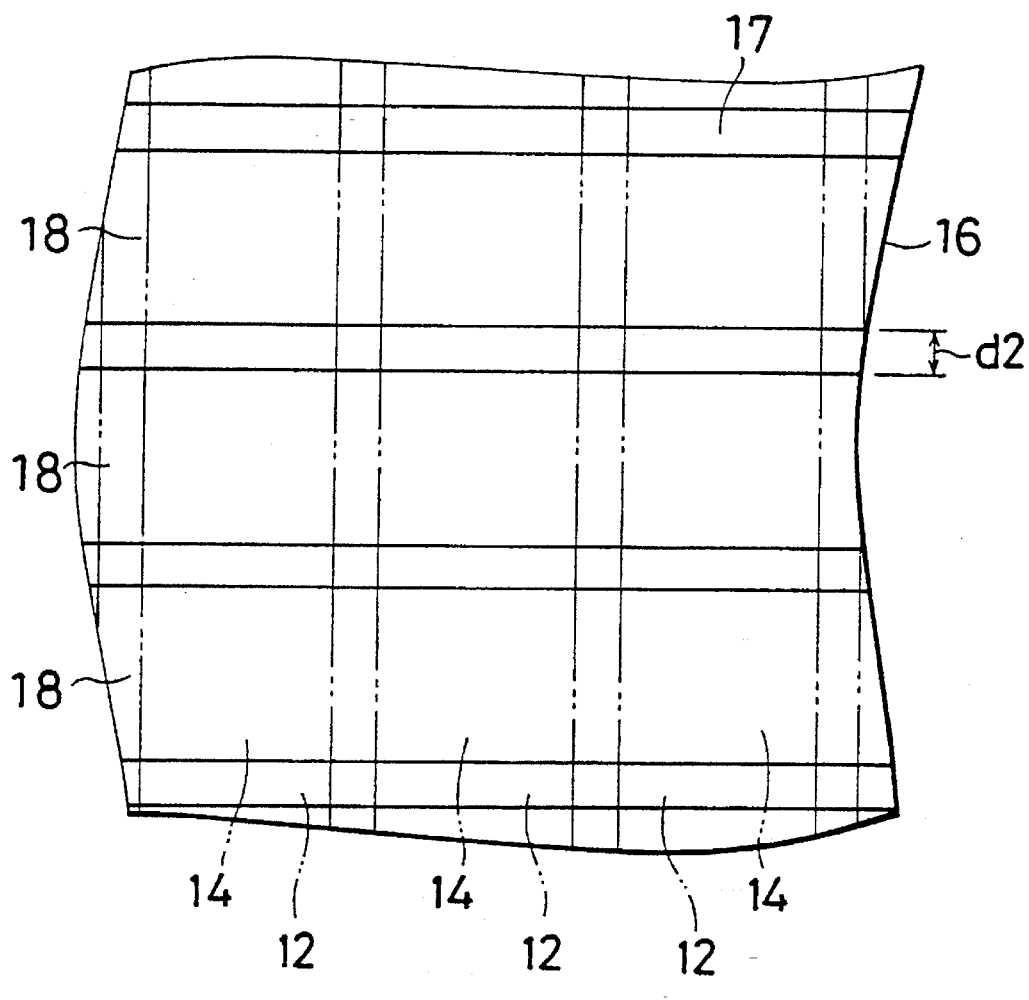
FIG. 4 is a plan view of a substrate 16 in the reflective type liquid crystal display device 22.

On the other hand, on the surface 16a of the insulating substrate 16 realized by light permeable material such as glass, the color filter 17 composed of a magenta filter 17a, a cyan filter 17b, and a yellow filter 17c formed corresponding to plural pixels is formed by, for example, dispersion method, dyeing method, printing method, and electrodeposition method. The individual filters 17a to 17c of the color filter 17 are formed, corresponding to the second conductor layers 14. On the color filter 17, a plurality of transparent electrodes 18 are formed in band form across a gap d2 capable of insulating from each other as shown in FIG. 4, in a direction orthogonal to the first conductor layers 12. The transparent electrodes 18 are realized, for example, by ITO (indium tin oxide), and the thickness is selected at 1000Å. Moreover, on the transparent electrodes 18, the protective film 19 for improving the smoothness is formed same as the protective film 15. Meanwhile, FIG. 4 is a plan view showing the insulating substrate 16 on which the color filter 17 and transparent electrodes 18 are formed, and for reference the first and second conductor layers 12, 14 formed on the insulating substrate 11 are indicated by virtual lines.

Such insulating substrates 11, 16 are disposed through the liquid crystal layer 20 realized by mixing 4.5% of optical activator (tradename S811 of Merck) in guest-host liquid crystal (tradename ZLI2327 of Merck) mixing a dichroic pigment 21 realized, for example, by a black pigment. The substrates 11, 16 are adhered with an adhesive, not shown in the drawing, with a spacer of 7 μm in diameter, for example, mixed in. The liquid crystal layer 20 is injected by evacuating the adhered substrates 11, 16 and gradually returning to normal pressure. Optical activator may not be added to the liquid crystal layer 20, and the same display as in the embodiment may be also executed in such a case. That is, the Liquid crystal layer 20 is realized by a nematic liquid crystal layer or a cholesteric liquid crystal layer containing dichroic pigment, or the high molecular resin layer dispersing the liquid crystal. The protective films 15, 19 may be prevented diffusion of impurities, for example, ions into the liquid crystal layer 20, so that contamination of the liquid crystal layer may be prevented. Therefore, fall of holding voltage factor may be prevented.

Figure 5:
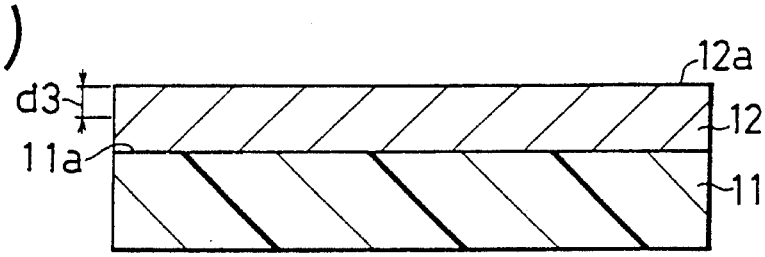
FIGS. 5 (1) through (5) are sectional views showing steps of the procedure of forming the MIM element.
Figure 5:
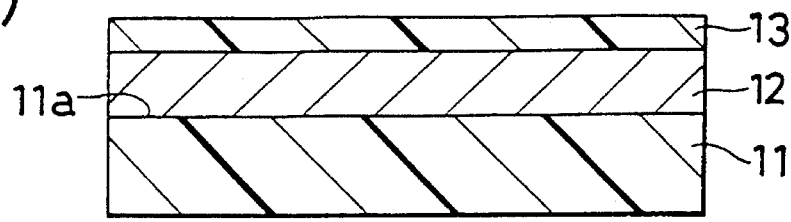
Figure 5:
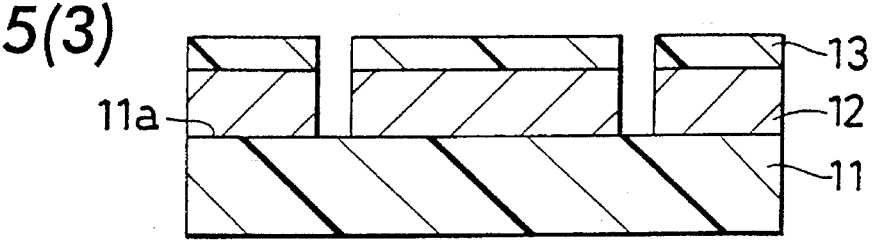
Figure 5:
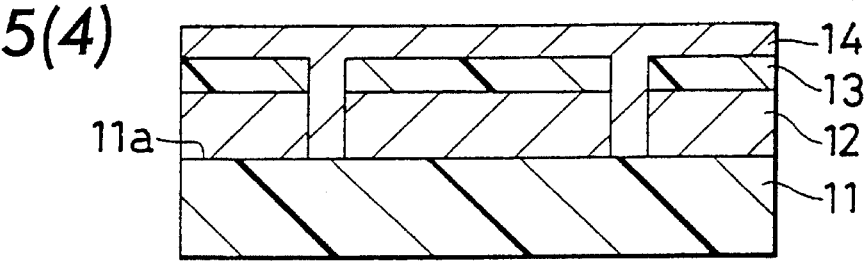
Figure 5:
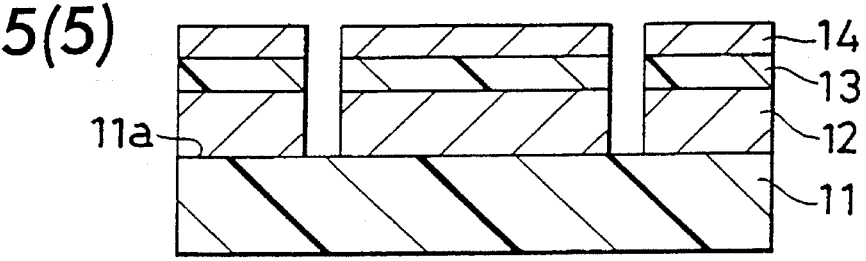

FIG. 5 is a sectional view showing the steps of the procedure of forming the MIM element. First, as shown in FIG. 5 (1), on the entire surface 11a of the substrate 11, the first conductor layer 12 is formed by reactive sputtering method or sinter target sputtering method. Consequently, the surface 12a of the conductor layer 12 is oxidized only decided thickness d3 by anodic oxidation method, wet oxidation method or dry oxidation method disclosed. For example, in the Japanese Unexamined Patent Publication (KOKAI) No. JP-A 5-119353, and as shown in FIG. 5 (2), the insulator layer 13 is formed. The insulator layer 13 is also formed by sputtering method or vapor deposition method. The formed conductor layer 12 and insulator layer 13 are simultaneously patterned as shown in FIG. 5 (3) by photolithographic method or dry etching method.

The patterning method of the conductor layer 12 and insulator layer 13 may be also realized by patterning by wet etching or dry etching after forming the conductor layer 12, and forming the insulator layer 13 by, for example, anodic oxidation method. In succession, on the entire surface 11a of the substrate 11 including the patterned conductor layer 12 and insulator layer 13, the second conductor layer 14 is formed as shown in FIG. 5 (5). This conductor layer 14 is patterned by photolithographic method or etching method as shown in FIG. 5 (5).

Figure 6:
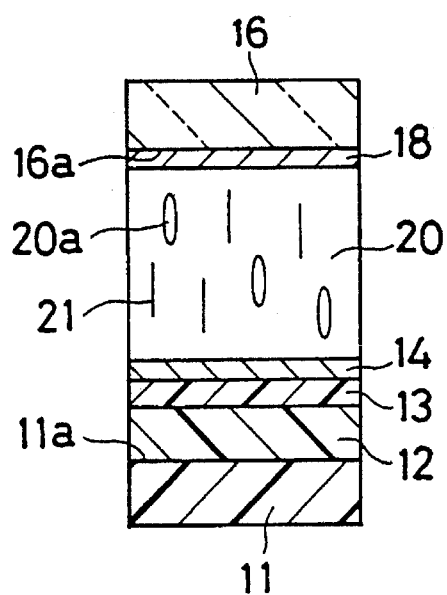
FIG. 6 (1) is a sectional view showing a pixel for explaining the principle of display of the reflective type liquid crystal display device 22.
Figure 6:
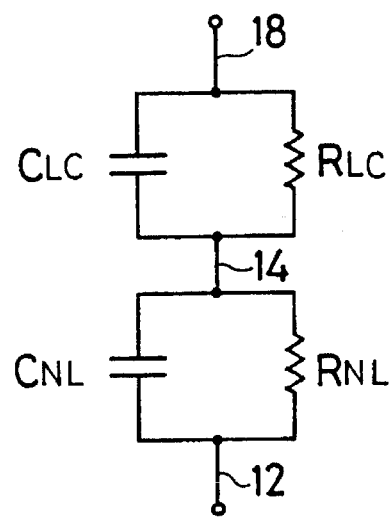

FIG. 6 is a diagram for explaining the principle of display of the reflective type liquid crystal display device 22. FIG. 6 (1) is a sectional diagram showing one pixel, and FIG. 6 (2) is an equivalent circuit diagram of one element.

When a current is supplied in the first conductor layer 12 which is the signal winding of the reflective type liquid crystal display device 22, a current flows into the second conductor layer 14 along the Poole-Frenkel current. When it is in a selective state between the transparent electrode 18 and the second conductor layer 14 which is a pixel electrode, a voltage is applied between the two, and the liquid crystal molecules 20a and dichroic pigments 21 are arranged almost vertically to the surfaces 11a, 16a of the insulating substrates 11, 16 as shown in FIG. 6 (1). Accordingly, the light entering the substrate 16 side passes through the liquid crystal layer 20, and is reflected by the second conductor layer 14 which is a reflector, and passes again through the liquid crystal layer 20, and is emitted.

The MIM element is expressed by a parallel circuit of resistance $R_{NL}$ and capacity $C_{NL}$, and the liquid crystal layer 20 is expressed by a parallel circuit of resistance $R_{LC}$ and capacity $C_{LC}$, and the MIM element possesses a nonlinear voltage-current characteristic, and the resistance $R_{NL}$ changes abruptly at the voltage at both ends. A selective pulse with amplitude V1 is applied to the first conductor layer 12 in every period T. On the other hand, to the transparent electrode 18, a data signal is applied at amplitude ± V2. When the selective pulse is applied to the conductor layer 12, the voltage (V1± V2) applied to the selected pixel is divided in capacity, and a voltage of $V_{NL} = C_{LC}/(C_{LC} + C_{NL}) \cdot (V1 \pm V2)$ is applied to the MIM element. Herein, supposing $C_{LC} \gg C_{NL}$, almost all voltage is applied to the MIM element, and the MIM element is set in ON state with a low resistance value, and an electric charge corresponding to the display data is written into the capacity $C_{LC}$ of the liquid crystal layer 20. At this time, the liquid crystal molecules 20a of the liquid crystal layer 20 and the dichroic pigments 21 are arranged almost vertically to the surfaces 11a, 16a of the insulating substrates 11, 16, so that the incident light is reflected.

On the other hand, when it is in a non-selective state between the transparent electrode 18 and the second conductor layer 14 which is the pixel electrode, no voltage is applied, and the liquid crystal molecules 20a and dichroic pigments 21 are arranged as being twisted between the substrates 11 and 16, parallel to the surfaces 11a, 16a of the insulating substrates 11, 16 as shown in FIG. 3. That is, the liquid crystal molecules 20a and dichroic pigments 21 are arranged irregularly on the whole. Accordingly, the light entering from the substrate 16 side is absorbed and cut off by the dichroic pigments 21. Thus display is realized by passing and reflecting the incident light, and display is realized by cutting off the incident light.

According to the first embodiment, as described herein, the first conductor layers 12, insulator layers 13 and second conductor layers 14 are composed to form the MIM element, and the second conductor layer 14 functioning as the pixel electrode and reflector is formed on the first conductor layer 12 functioning as the signal wiring, the area used only for the signal wiring as the nonactive portion not functioning in the screen display and the area used only for the MIM element as required in the prior art are not necessary. Accordingly, the pixel interval can be narrowed, and the pixel area can be increased, and the aperture rate is enhanced, the display becomes bright, and the display quality is improved.

Besides, being of White-Taylor type display mode, the polarizer is not needed, and the display is brighter. In the display mode, moreover, orientation processing is not necessary, that is, rubbing process is not needed, and therefore physical breakdown and electrostatic breakdown of the MIM element can be prevented, and the film thickness of the insulator layer 13 can be reduced, so that the switching performance may be enhanced.

Figure 7:
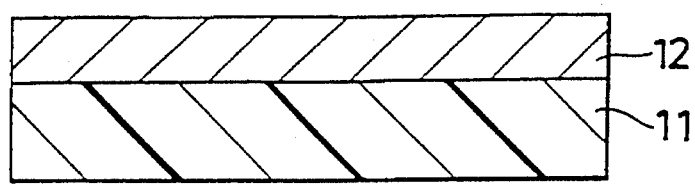
FIGS. 7 (1) to 7 (4) are sectional views showing steps of the other procedure of forming the MIM element.
Figure 7:
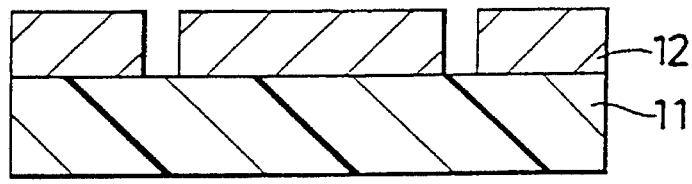
Figure 7:
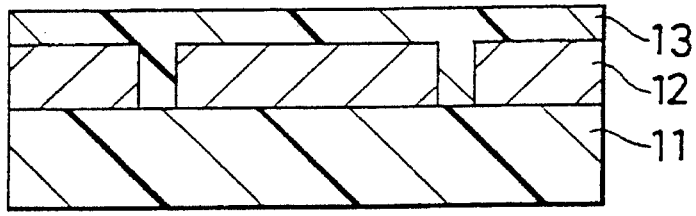
Figure 7:
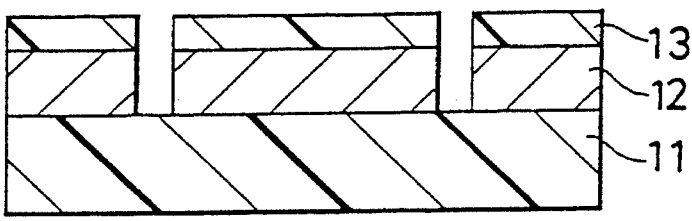

FIG. 7 is a sectional view showing the steps of the other procedure of forming the MIM element. First, as shown in FIG. 7 (1), on the entire surface 11a of the substrate 11, the first conductor layer 12 is formed by sputtering method. Consequently, the first conductor layer 12, as shown in FIG. 7 (2), is patterned by wet etching method or dry etching method. On the entire surface 11a of the substrate 11 including the patterned conductor layer 12, the insulator layer 13 is formed as shown in FIG. 7 (3). The formed insulator layer 13 is patterned by dry etching method as shown in FIG. 7 (4). The second conductor layer 14 is formed as mentioned above.

Figure 8:
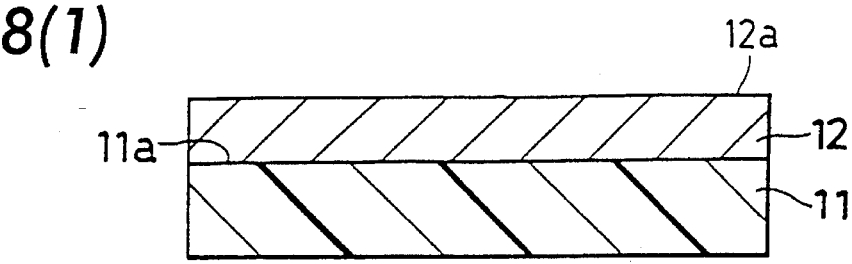
FIGS. 8 (1) to 8 (3) are sectional views showing steps of the more other procedure of forming the MIM element.
Figure 8:
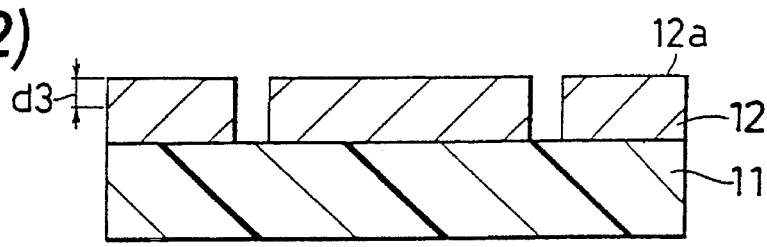
Figure 8:
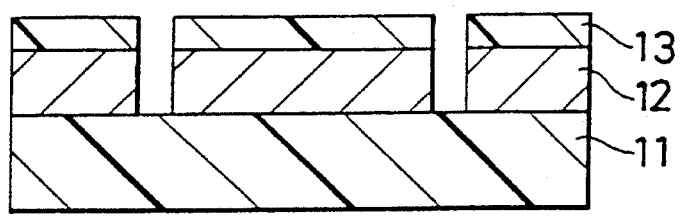

FIG. 8 is a sectional view showing the steps of the more other procedure of forming the MIM element, and this forming method is formed the insulator layer 13 after patterned the first conductor layer 12. The insulator layer 13 is formed, as the conductor layer 12 is oxidized only decide thickness d3. First, as shown in FIG. 8 (1), on the entire surface 11a of the substrate 11, the first conductor layer 12 is formed by sputtering method. Consequently, the conductor layer 12 is patterned by wet etching method as shown FIG. 8 (2). The surface 12a of the conductor layer 12 is oxidized only decided thickness d3 by anodic oxidation method, wet oxidation method, or dry oxidation method, as shown FIG. 8 (3), the insulator layer 13 is formed. The second conductor layer 14 is formed as mentioned above.

Figure 9:
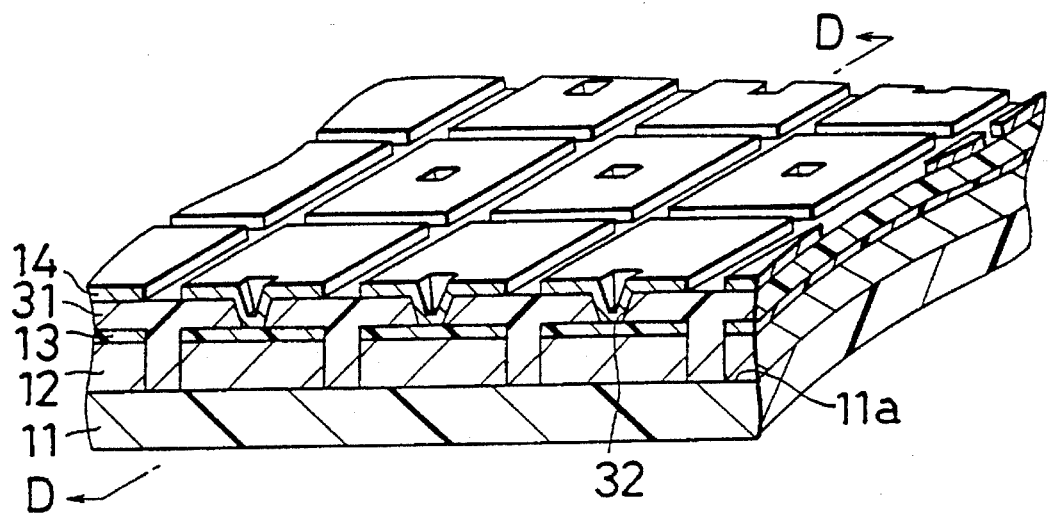
FIGS. 9 (1) and (2) are sectional perspective views showing the structure of MIM element in a reflective type liquid crystal display device 33 in a second embodiment of the invention.
Figure 9:
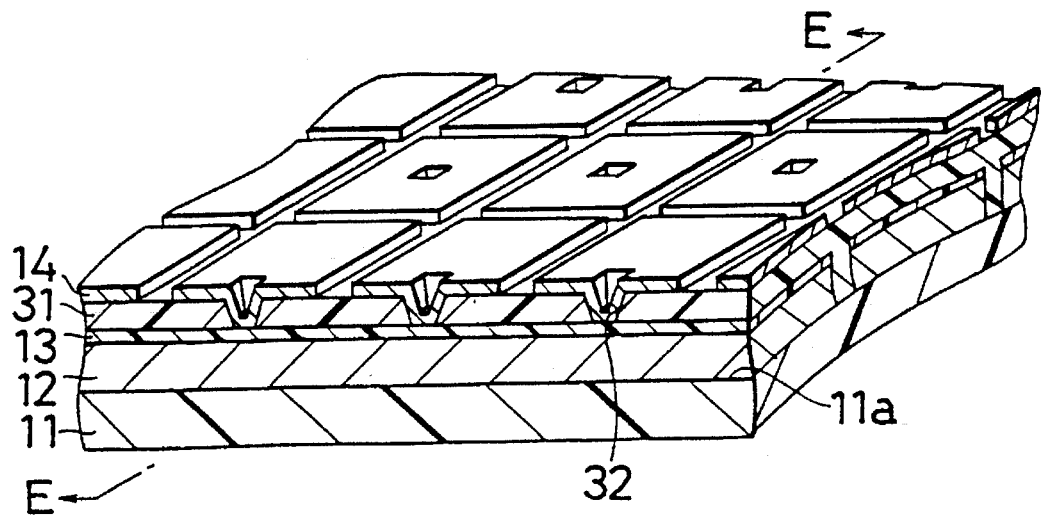
Figure 10:
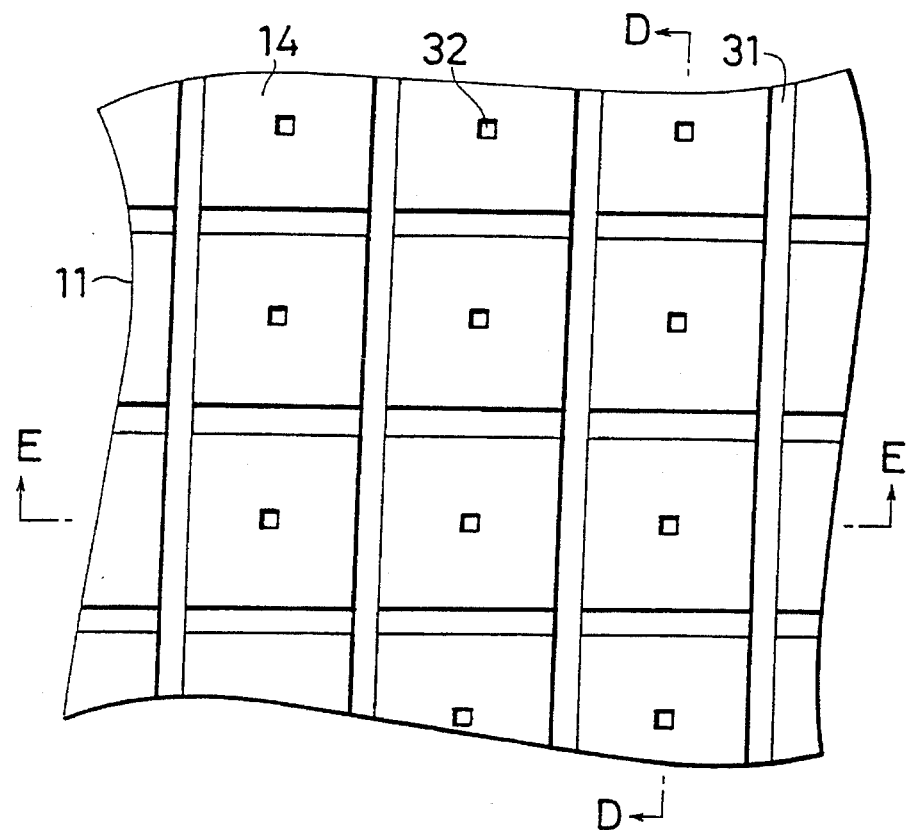
FIG. 10 is a plan view of a substrate 11 on which the MIM element is formed.
Figure 11:
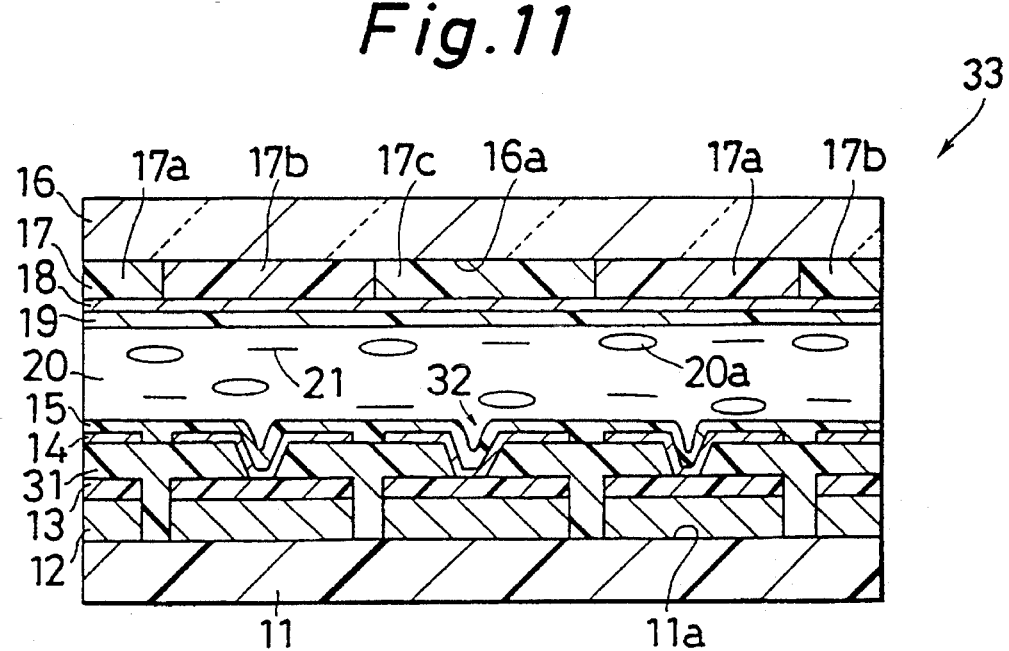
FIG. 11 is a sectional view showing the constitution of the reflective type liquid crystal display device 33.

FIG. 9 is a sectional perspective view showing the structure of the MIM element in a reflective type liquid crystal display device 33 of FIG. 11 in the second embodiment of the invention, and FIG. 10 is a plan view of the insulating substrate 11 forming the MIM element. FIG. 9 (1) is a sectional perspective view being cut off along line E—E, and FIG. 9 (2) is a sectional perspective view being cut off along line D—D. The MIM element of the reflective type liquid crystal display device 33 in the second embodiment possesses nearly a same structure as the MIM element in the first embodiment, but an organic insulator layer 31 is formed between the insulator layer 13 and second insulator layer 14, and a contact hole 32 is formed in the organic insulator layer 31. In FIGS. 9, 10 and 11 for explaining the second embodiment, same constituent members as in the first embodiment are identified with same reference numbers.

On the surface 11a of the insulating substrate 11, same as in the first embodiment, first conductor layers 12 and insulating layers 13 are patterned. On the surface 11a of the substrate 11 on which the first conductor layers 12 and insulator layers 13 are formed, the organic insulator layer 31 is formed. This organic insulator layer 31 is a photosensitive resin, and is realized, for example, by polyimide resin or acrylic resin, and its film thickness is 0.5 μm to 3 μm, or preferably 2 μm. In the embodiment, a polyimide resin having a thickness of 2 μm was formed as the organic insulator layer 31. The organic insulator layer 31 formed on the entire surface 11a of the insulating substrate 11 is rid of the region to be used as contact holes 32 by photolithographic method and dry etching method in order to form the contact holes 32 described later.

On the surface of the organic insulator layer 31, same as in the first embodiment, second conductors 14 are formed. Connection of the second conductor layers 14 and insulator layers 13 is realized by the contact holes 32 formed in the organic insulator layers 31. The contact holes 32 are formed in the organic insulator layers 31 in which plural conductor layers 14 are formed, being formed so that the sectional area of one contact hole 32 may be 2 $\mu m^2$ to 100 $\mu m^2$, preferably 25 $\mu m^2$.

The MIM element of the embodiment is also composed of first conductor layers 12, insulator layers 13 and second conductor layers 14 same as in the first embodiment, and the first conductor layers 12 also serve as the signal wiring, and the second conductor layers 14 serve also as pixel electrodes and reflectors. Accordingly, the place only for the signal wiring in the prior art is not necessary, and the place only for the MIM element is not needed, so that the pixel interval may be narrower, and the pixel area may be larger, so that the aperture rate is increased. In the reflective type liquid crystal display device 33 of the embodiment, the aperture rate is improved to about 97% same as in the first embodiment.

Besides, by forming the organic insulating layer 31, it is possible to prevent short circuit of the first conductor layer 12 and second conductor layer 14. That is, in the first embodiment, after the first conductor layers 12 and insulator layers 13 are patterned on the substrate 11, the second conductor layers 14 are formed by photolithographic method or etching method. To prevent short circuit of the first conductor layers 12 and second conductor layers 14, in etching of the second conductor layers 12, the conductor layers formed among the plurality of first conductor layers 12 and insulator layers 13 must be removed completely. However, it is difficult to remove completely the conductor layers formed in narrow gaps, and the reliability is lowered. In the second embodiment, sine the organic insulator layers 31 are formed, such inconvenience in etching does not occur, and hence it is possible to present the reflective type liquid crystal display device 33 possessing the MIM element excellent in reliability.

FIG. 11 is a sectional view showing the constitution of the reflective type liquid crystal display device 33 in the second embodiment of the invention. On the surface 11a of the insulating substrate 11, as mentioned above, the first conductor layers 12, insulator layers 13, organic insulator layers 31, and second conductor layers 14 are formed, and the insulator layers 13 and second conductor layers 14 are connected through contact holes 32. On the surface thereof, a protective film 15 is formed. On the other hand, on the surface 16a of the insulating substrate 16, same as in the first embodiment, color filter 17, transparent electrodes 18, and protective film 19 are formed in this order. The surfaces 11a, 16a of such insulating substrates 11, 16 are adhered through the liquid crystal layer 20 same as in the first embodiment.

When a current is supplied in the first conductor 12 of such reflective type liquid crystal display device 33, a current flows into the second conductor layer 14 according to Poole-Frenkel current. Accordingly, the display is executed in the same manner as in the first embodiment, and similar effects are obtained.

Figure 12:
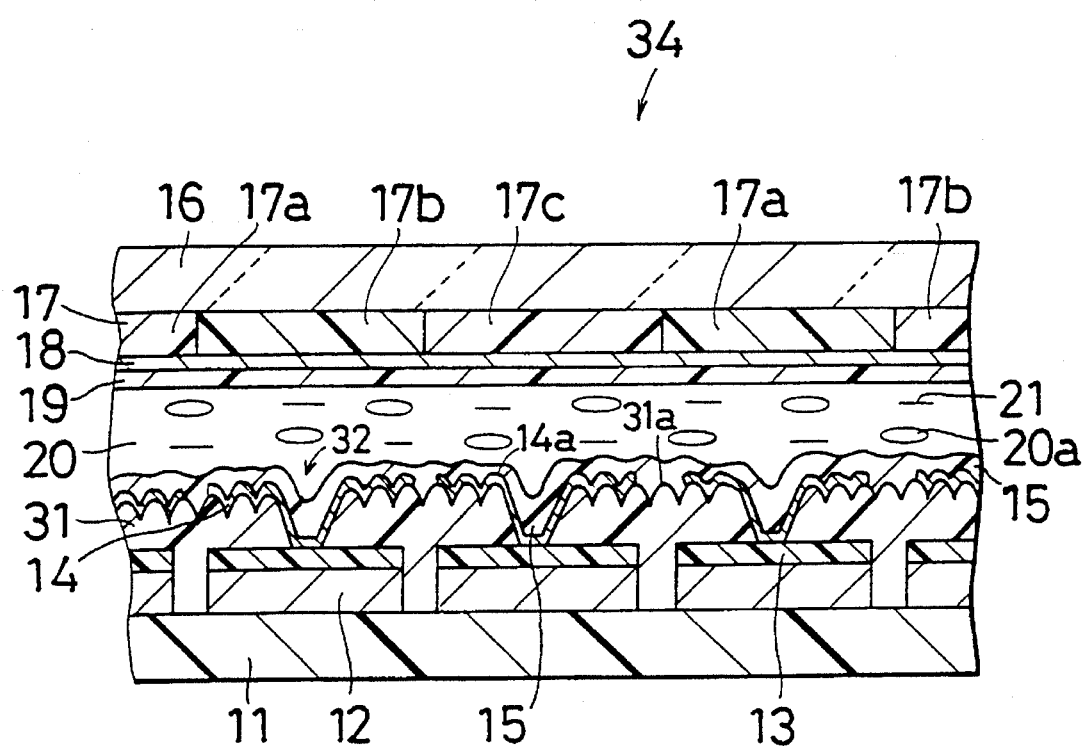
FIG. 12 is a sectional view showing the constitution of a reflective type liquid crystal display device 34 in a third embodiment of the invention.
Figure 13:
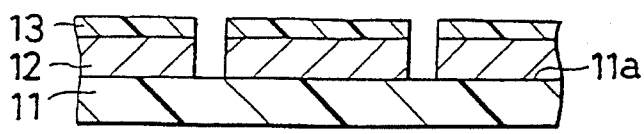
FIGS. 13 (1) to (6) are sectional views showing the steps of procedure of forming undulations.
Figure 13:
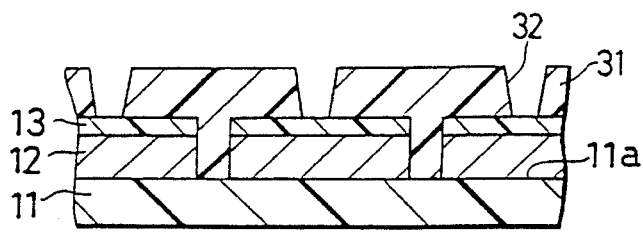
Figure 13:
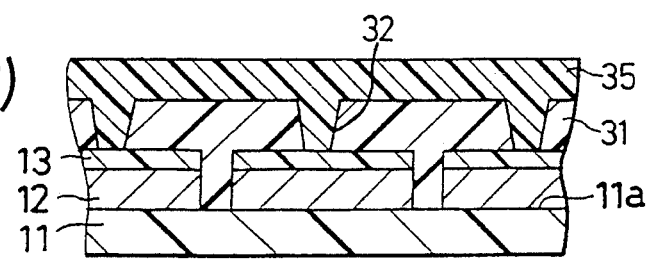
Figure 13:
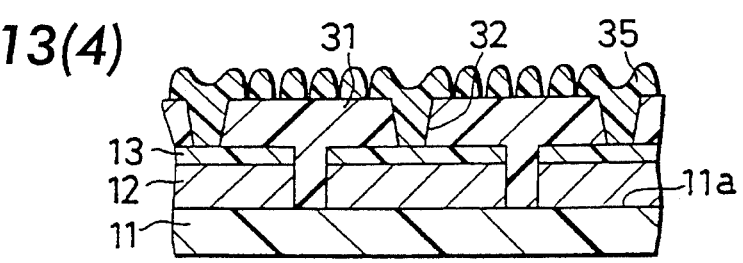
Figure 13:
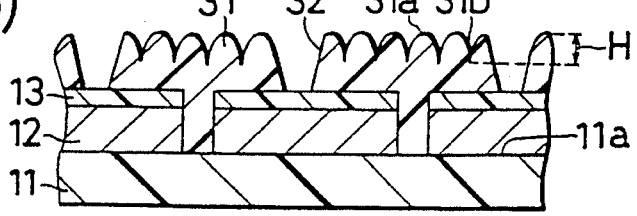
Figure 13:
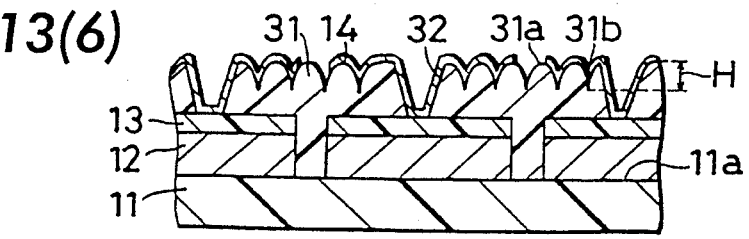
Figure 15:
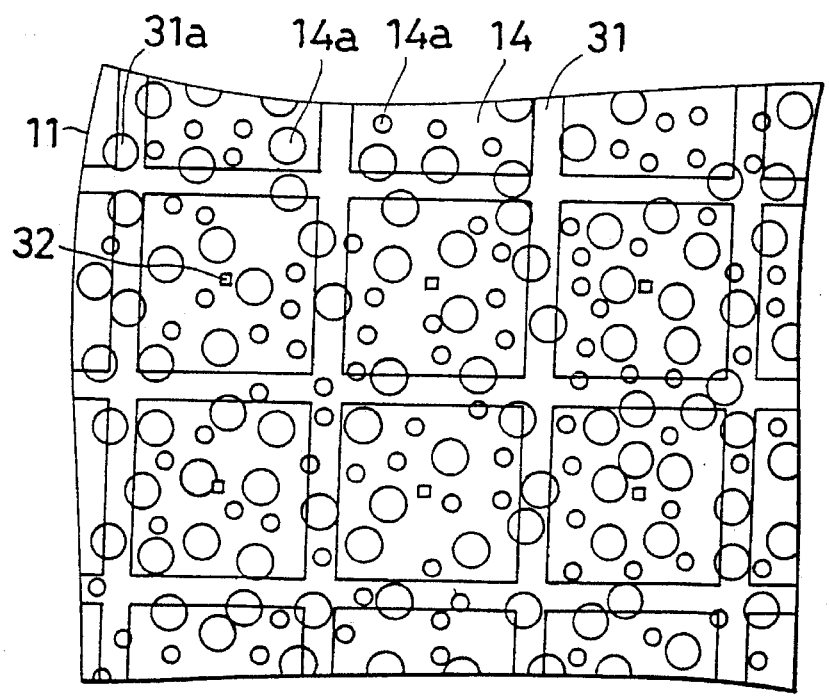
FIG. 15 is a plan view of the substrate 11 on which undulations are formed.
Figure 16:
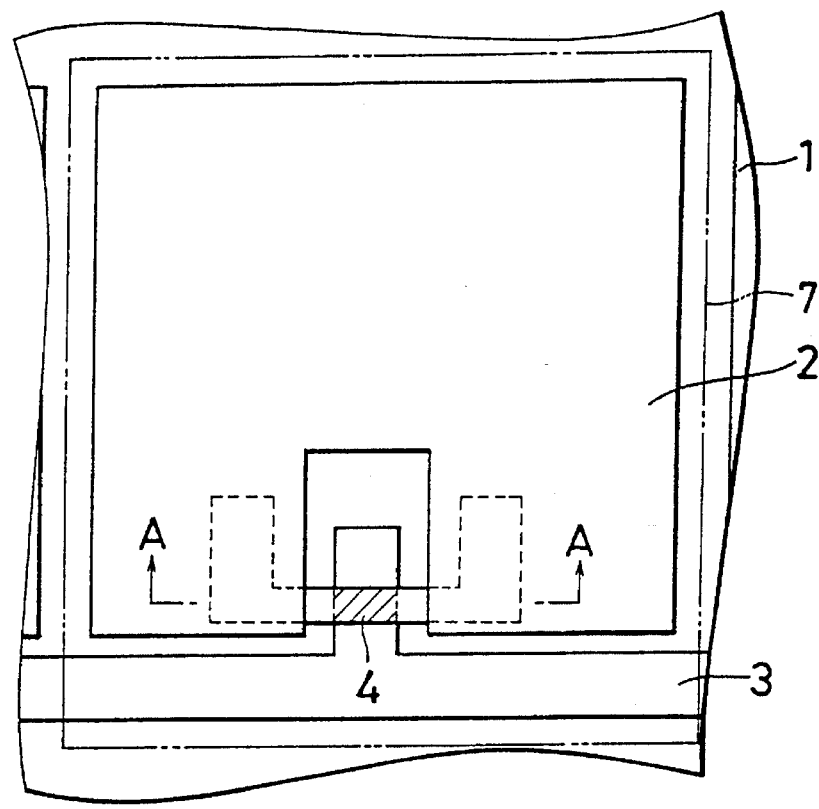
FIG. 16 is a plan view showing a pixel in a display device in which a conventional MIM element 4 is formed.
Figure 17:
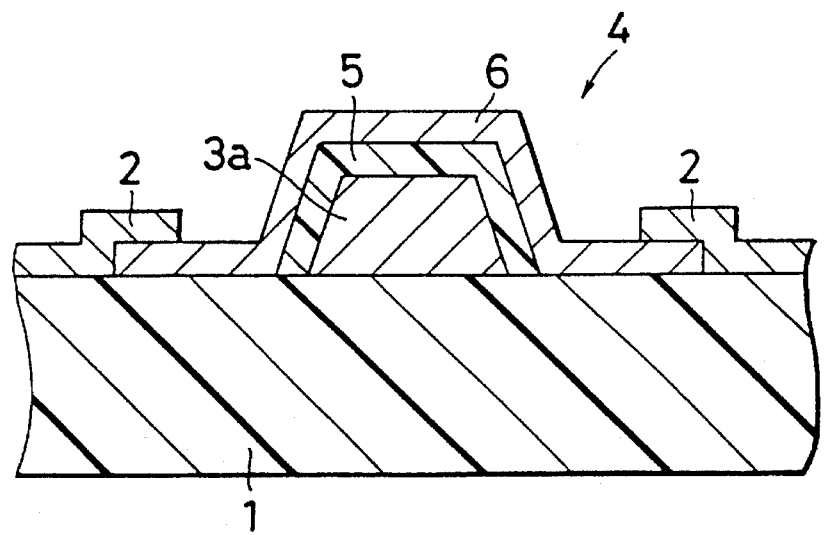
FIG. 17 is a sectional view of the MIM element 4 along the cut-off line A—A.
Figure 18:
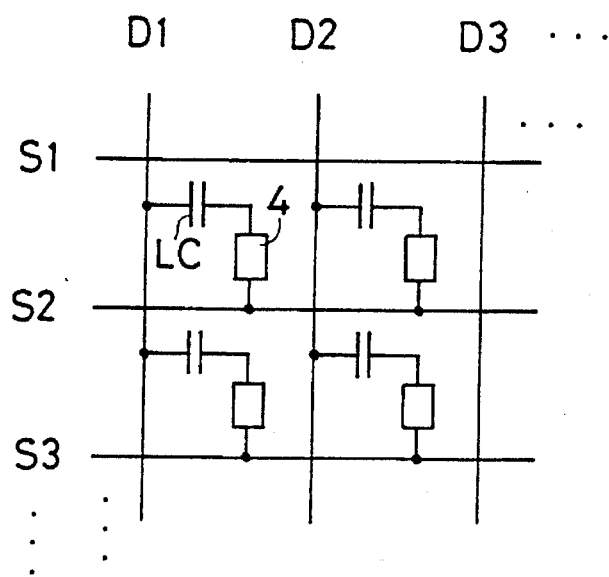
FIG. 18 is an equivalent circuit diagram of a reflective type liquid crystal display device using the MIM element 4.
Figure 19:
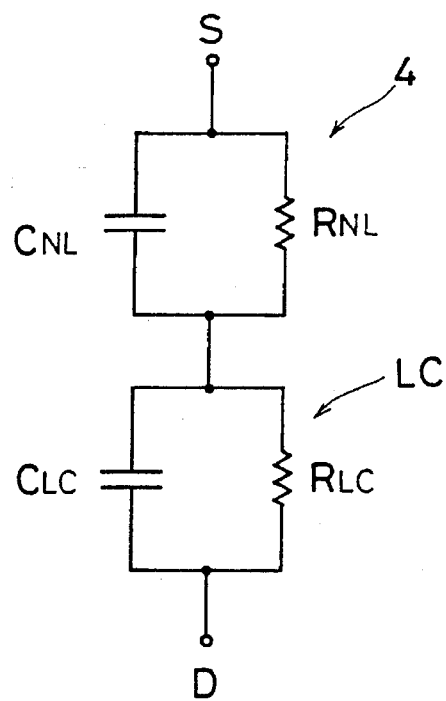
FIG. 19 is an equivalent circuit diagram of one pixel of the reflective type liquid crystal display device using the MIM element 4.

FIG. 12 is a sectional view showing the constitution of a reflective type liquid crystal display device 34 in a third embodiment of the invention. The reflective type liquid crystal display device 34 is constituted nearly same as the reflective type liquid crystal display device 33 in the second embodiment, and it is characterized by forming undulations on the surface of the second conductor layers 14. In FIGS. 12, 13, and 15 to describe the third embodiment, the same constituent members as in the first and second embodiments are identified with same reference numbers.

On the surface 11a of the insulating substrate 11, same as in the second embodiment, first conductor layers 12, insulator layers 13, and the organic insulator layer 31 are formed. On the surface of the organic insulator layer 31, undulations are formed by the method described later. On the organic insulator layer 31 on which undulations are formed, the second conductor layers 14 are formed, and the film thickness of the second conductors 14 is 500Å to 3000 Å, or preferably selected at 2000Å, and since it is very thin, the undulations formed on the surface of the organic insulator layer 31 are also formed on the conductor layers 14. On the surface of the conductor layers 14 having undulations, the protective film 15 is formed. Such substrate 11 is adhered, same as in the first and second embodiments, to the insulating layer 16 forming the color filter 17, transparent electrodes 18, and the protective film 19 in this order, through the liquid crystal layer 20.

Figure 14:
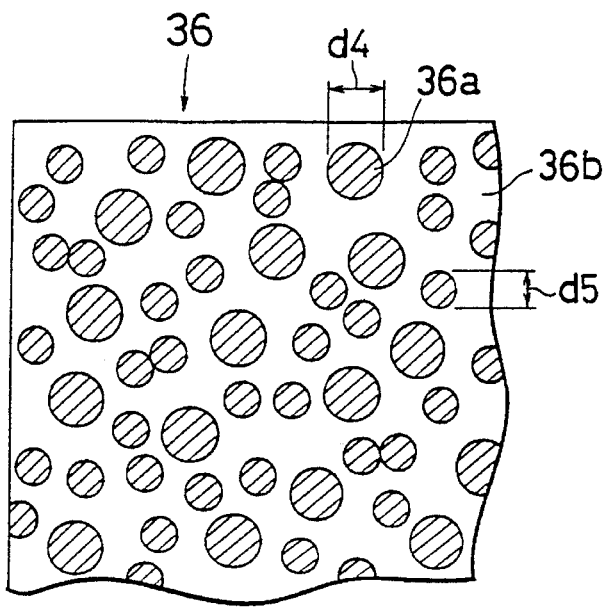
FIG. 14 is a plan view showing a mask 36.

FIG. 13 is a sectional view showing the steps of the procedure of forming the undulations. FIG. 14 is a plan view showing a mask 36 used when exposing a resist 35. Although FIG. 14 is a plan view, a light shielding region 36a is indicated by shading.

First, on the surface 11a of the insulating substrate 11, as shown in FIG. 13 (1), the first conductor layer 12 and insulator layer 13 are patterned, and as shown in FIG. 13 (2), the organic insulator layer 31 is patterned. On the surface 11a of the substrate 11 on which the organic insulator layer 31 is formed, as shown in FIG. 13 (3), the resist 35 is formed on the entire surface. On this resist 35, the mask 36 as shown in FIG. 14 is disposed, and exposure and development are processed. On the mask 36, plural circular light shielding regions 36a having mutually different two diameters d4, d5 shown in the shaded area in FIG. 14 are formed irregularly. The other regions than the these light shielding regions 36a are light permeable regions 36b. The patterned resist 35 is treated at a proper temperature in a range of 120° C. to 250° C. in order to eliminate corners. In this embodiment, by heating for 30 minutes at 200° C., a round resist 35 was obtained as shown in FIG. 13 (4).

In succession, the organic insulator layer 31 is etched according to the resist 35, and undulations are formed. The distance H between the convex portion 31a and concave portion 31b of the organic insulator layer 31, that is, the height of the undulations is formed to be 0.5 μm. Besides, as mentioned above, heat treatment is applied to the resist 35 to eliminate corners, and the undulations formed in the organic insulator layer 31 are also round without corners as shown in FIG. 13 (5). The height H of the undulations is desired to be 10 μm or less, which is a general cell thickness, in order to form the organic insulator layers 31 and contact holes 32 securely, and to decrease fluctuations of the cell thickness. The shape of the convex portion 31a is controlled by the shape of the mask 36, thickness of the resist 35, and the etching time.

On the undulated organic insulator layer 31, same as in the first and second embodiments, the second conductor layer 14 is formed. This conductor layer 14 is very thin, and the undulations are formed also on the surface of the conductor layer 14 as shown in FIG. 13 (6).

FIG. 15 is a plan view the substrate 11 forming such undulations. Thus, plural convex portions 14a formed on the second conductor layers 14 and plural convex portions 31a formed on the organic insulator layers 31 are formed irregularly on the surface of the substrate 11.

Thus, in the reflective type liquid crystal display device 34 in the embodiment, the display is executed in the same manner as in the second embodiment, and the same effects as in the first and second embodiments are obtained. Undulations are formed on the surface of the second conductor layer 14 which is a reflector, and the incident light scatters, and the intensity of the light scattering in the vertical direction to the display screen is intensified, so that the brightness and contrast may be enhanced.

In this embodiment, the mask 36 having plural circular light shielding regions 36a possessing mutually different two diameters d4, d5 arranged irregularly is used, but plural circular light shielding regions possessing one same diameter may be formed, for example, on the mask 36, or plural circular light shielding regions possessing three or more different diameters may be also formed. Not limited to the irregular arrangement of the light shielding regions 36a, if arranged regularly, it is included in the scope of the invention.

Although the foregoing embodiment relates to an example of the resist 35 formed on the organic insulator layer 31, the organic insulator layer 31 is realized by photosensitive resin, so that the undulations may be formed without forming the resist 35. But, in this embodiment, the undulations are formed using the resist 35 by reason described below. That is, the contact holes 32 and the undulations are formed on the organic insulator layer 31. The depth of the contact holes 32 is 0.5 μm to 3 μ, or preferably selected to be 2 μ, and the height of the undulations is selected to be 0.5μ. Thus the etching thickness is different, so that the quantity of light at exposing is different. Accordingly, it is difficult that the contact holes 32 and the undulatins are formed without forming the resist 35 on the organic insulator layer 31. Therefore, the method that the resist 35 is formed is used in order to separate forming process of the contact holes 32 and forming process of the undulations.

The display devices 22, 33, 34 in the first to third embodiments are reflective type display devices in which the second conductor layers 14 as pixel electrodes are provided with the function of reflectors, and therefore as the material for the substrate 11, for example, plastics, ceramics, glass, iron plate, aluminum foil, and metal plate can be used. When using metal plate, however, it is necessary to install an undercoating film made of insulating material on the entire metal plate surface or between the metal plate and the first conductor layer 12.

In the first to third embodiments, examples of display mode of White-Taylor type are shown, but the scope of the invention also includes the high molecular dispersion type display mode not using polarizer. The liquid crystal display device of high molecular dispersion type display mode is used the high molecular resin layer dispersing liquid crystal. The high molecular resin is used, for example, a ultraviolet polymerized resin realized by a polymethyl methacrylate or polyacrylate monomer, a polymethyl methacrylate or polyacrylate oligomer, or a mixture of them, or polyvinylalcohol. These material is easy to control the diameters of dispersed liquid crystal molecular. Therefore, the liquid crystal display device may be driven at lower voltage. Further homogeneous resin layer may be formed, so that fall of holding voltage factor may be prevented. Besides, the polymerized reaction speed for forming the resin layer is comparatively faster, so that the efficiency of production may be enhanced.

Although the foregoing embodiments relate to examples of liquid crystal display device without using polarizer, it is also possible to apply to the display mode using polarizer, and as compared with the conventional display mode using polarizer, the aperture rate is raised, and the display is brighter, and the display quality is enhanced.

In the display mode using polarizer, the protective films 15, 19 are also using as orientation films. That is, the surface of protective films 15, 19 is rubbed. The protective films 15, 19 may be prevented a breakdown of MIM element by rubbing process, and when a crosstalk is occurred by short circuit current, deterioration of display quality may be prevented. An example of such the display mode using polarizer is a guest-host mode which is the dichroic pigment 21 mixed in the liquid crystal layer 20, a polarizer is setting the wrong side of the liquid crystal layer 20 of the substrate 16. In this display mode, when no voltage is applied, the incident light is absorbed by the dichroic pigment 21, so that the display of the color of the dichroic pigment 21 is realized. When a voltage is applied, the incident light is transmitted, and reflected by a reflector, so that the bright display is realized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflective type liquid crystal display device comprising:

a nematic liquid crystal layer or a cholesteric liquid crystal layer containing dichroic pigment, or a high molecular resin layer dispersing liquid crystal, interposed between a pair of insulating substrates at least one of which possessing light permeability, plural common electrodes formed in bands with a gap in between adjacent common electrodes on the side of one substrate possessing light permeability of the pair of insulating substrates confronting the other substrate side, plural first conductors formed in bands with a gap in between adjacent common electrodes in a direction orthogonal to the common electrodes on one side of the other substrate of the pair of insulating substrates, band-shaped insulators formed on the plural first conductors individually, and second conductors possessing reflectivity and forming pixel electrodes, formed in a region overlapping with the common electrodes on the band-shaped insulators.

2. The reflective type liquid crystal display apparatus as claimed in claim 1, wherein a color filter is formed between one substrate and common electrodes.

3. The reflective type liquid crystal display apparatus as claimed in claim 1, wherein protective films are formed on the surface of one substrate on which the common electrodes are formed, and on the surface of the other surface on which the first conductors, band-shaped insulators and second conductor are formed.

4. The reflective type liquid crystal display apparatus as claimed in claim 1, a ultraviolet polymerized resin realized by a polymethyl methacrylate or polyacrylate monomer, a polymethyl methacrylate or polyacrylate oligomer, a mixture of them, or polyvinylalcohol is selected as a high molecular resin of the high molecular resin layer dispersing the liquid crystal.

5. A reflective type liquid crystal display device comprising:

a nematic liquid crystal layer or a cholesteric liquid crystal layer containing dichroic pigment, or a high molecular resin layer dispersing liquid crystal, interposed between a pair of insulating substrates at least one of which possessing light permeability, plural common electrodes formed in bands with a gap in between adjacent common electrodes on the side of one substrate possessing light permeability of the pair of insulating substrates confronting the other substrate side, plural first conductors formed in bands with a gap in between adjacent common electrodes in a direction orthogonal to the common electrodes on one side of the other substrate of the pair of insulating substrates, band-shaped insulators formed on the plural first conductors individually, second conductors possessing reflectivity and forming pixel electrodes, formed in a region overlapping with the common electrodes on the band-shaped insulators, and organic insulators formed on the surface of the other substrate on which the first conductors and band-shaped insulators are formed, and possessing penetration holes at predetermined positions on the band-shaped insulators, wherein the second conductors are formed on the penetration holes and organic insulators.

6. The reflective type liquid crystal display apparatus as claimed in claim 5, wherein convex portions are formed on the surface of the organic insulators.

7. The reflective type liquid crystal display apparatus as claimed in claim 5, wherein a color filter is formed between one substrate and common electrodes.

8. The reflective type liquid crystal display apparatus as claimed in claim 5, wherein protective films are formed on the surface of one substrate on which the common electrodes are formed, and on the surface of the other surface on which the first conductors, band-shaped insulators and second conductor are formed.

9. The reflective type liquid crystal display apparatus as claimed in claim, 5, a ultraviolet polymerized resin realized by a polymethyl methacrylate or polyacrylate monomer, a polymethyl methacrylate or polyacrylate oligomer, a mixture of them, or polyvinyl alcohol is selected as a high molecular resin of the high molecular resin layer dispersing the liquid crystal.

10. A manufacturing method of reflective type liquid crystal display device comprising the steps of:

preparing a pair of insulating substrates either one of which possessing light permeability, forming plural band-shaped common electrodes on one side of one substrate possessing light permeability, forming plural band-shaped first conductors on one side of the other substrate, forming band-shaped insulators on the plural first conductors, and forming plural second conductors possessing reflectivity on the insulators at same line width and interval as the first conductors, adhering the pair of insulating substrates across a specific gap so that the surfaces of the substrates may confront each other, and that the common electrodes and first conductors intersect orthogonally, and moreover that the common electrodes and second conductors may overlap, and injecting a nematic liquid crystal layer or a cholesteric liquid crystal layer containing dichroic pigment, or a high molecular resin layer dispersing liquid crystal, between the pair of insulating substrates.

11. The manufacturing method of reflective type liquid crystal display device as claimed in claim 10, wherein a conductor film and an insulator film are laminated in this order on one side of the other substrate, and the conductor film and insulator film are patterned simultaneously in plural bands to form the first conductors and band-shaped insulators.

12. The manufacturing method of reflective type liquid crystal display device as claimed in claim 11, wherein the surface of the conductor film is oxidized to form the insulator film.

13. The manufacturing method of reflective type liquid crystal display device as claimed in claim 10, wherein a conductor film is formed on one side of the other substrate, and the conductor film is patterned into plural bands to form the fist conductors, and the band-shaped insulators are formed on the first conductors.

14. The manufacturing method of reflective type liquid crystal display device as claimed in claim 10, wherein a conductor film is formed on one side of the other substrate, the conductor film is patterned into plural bands, and the surface of the patterned conductor film is oxidized to form the first conductors and bandshaped insulators.

15. The manufacturing method of reflective type liquid crystal display device as claimed in claim 10, wherein an organic insulator is formed on one side of the other substrate on which the first conductors and band-shaped insulators are formed, and penetration holes are formed at predetermined positions on the band-shaped insulators of the organic insulators, and the second conductors are formed on the penetration holes and organic insulator.

16. The manufacturing method of reflective type liquid crystal display device as claimed in claim 15, wherein plural convex portions are formed on the surface of the organic insulator.

17. The manufacturing method of reflective type liquid crystal display device as claimed in claim 16, wherein a photosensitive resin is applied on the organic insulator, the photosensitive resin is exposed through light shielding means consisting of plural circular light shielding regions, developed, and heated, and the organic insulator is etched to form the convex portions.

18. The manufacturing method of reflective type liquid crystal display device as claimed in claim 17, wherein the plural circular light shielding regions possess one or two or more different diameters, and the light shielding regions are arranged irregularly.

* * * * *